Figure 1:
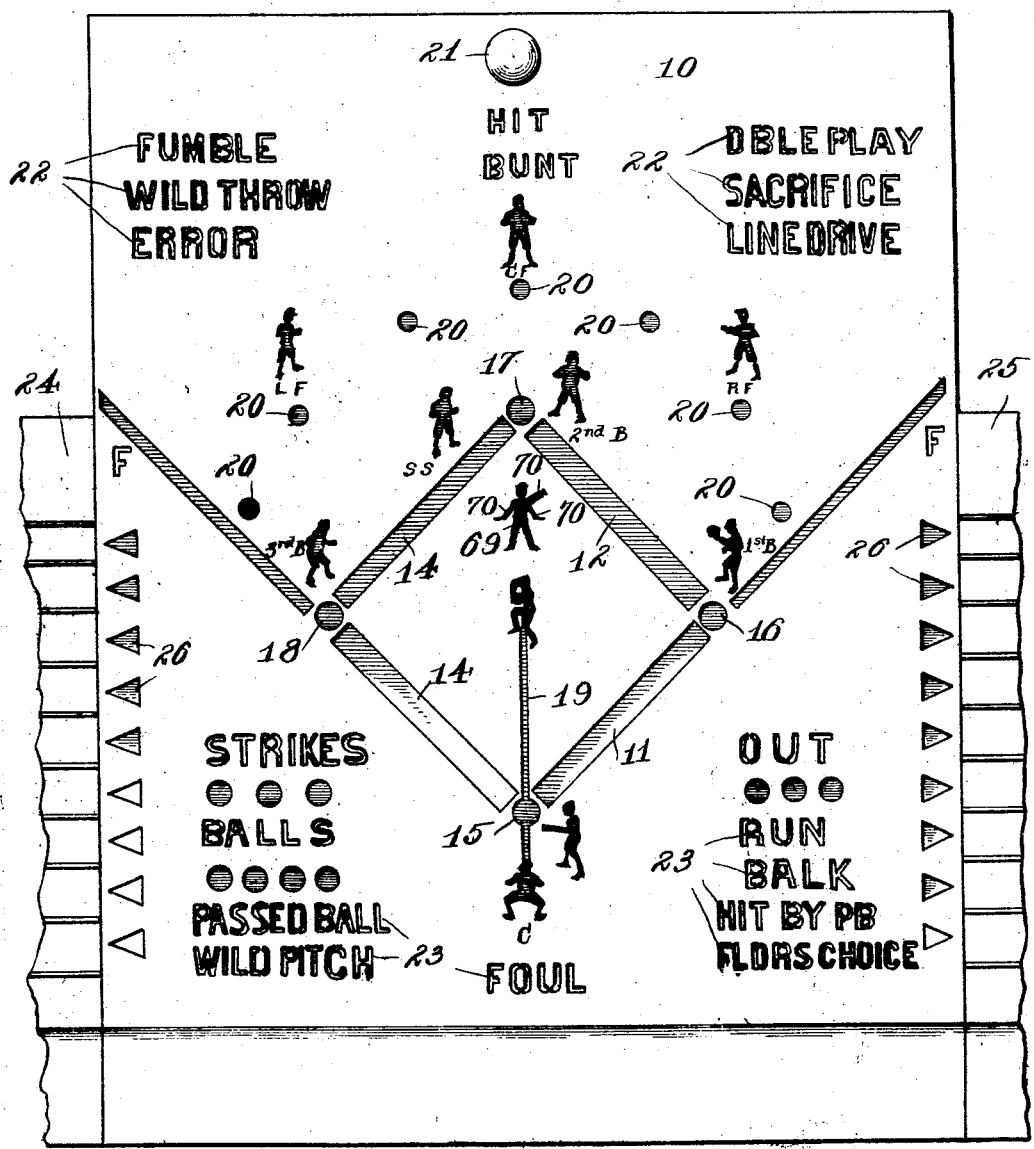

A. J. BRYLAWSKI.
SCORE BOARD.
APPLICATION FILED AUG. 22, 1913.

1,149,021.

Patented Aug. 3, 1915.
4 SHEETS—SHEET 1.

Witnesses
G. A. Paulerschmidt
B. M. Kent

Inventor
A. Julian Brylawski
By Foster Freeman Watson & Coit
Attorneys

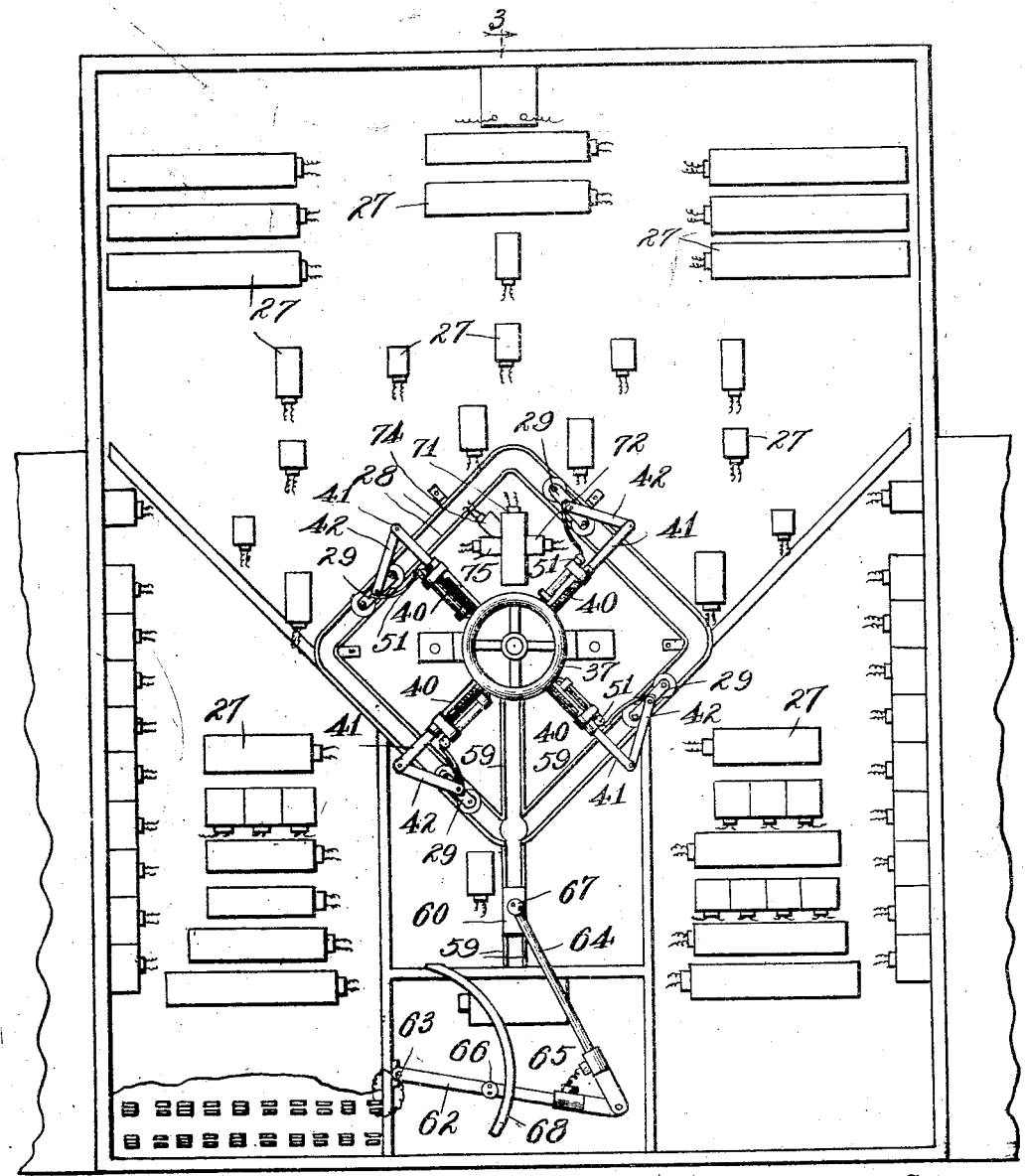

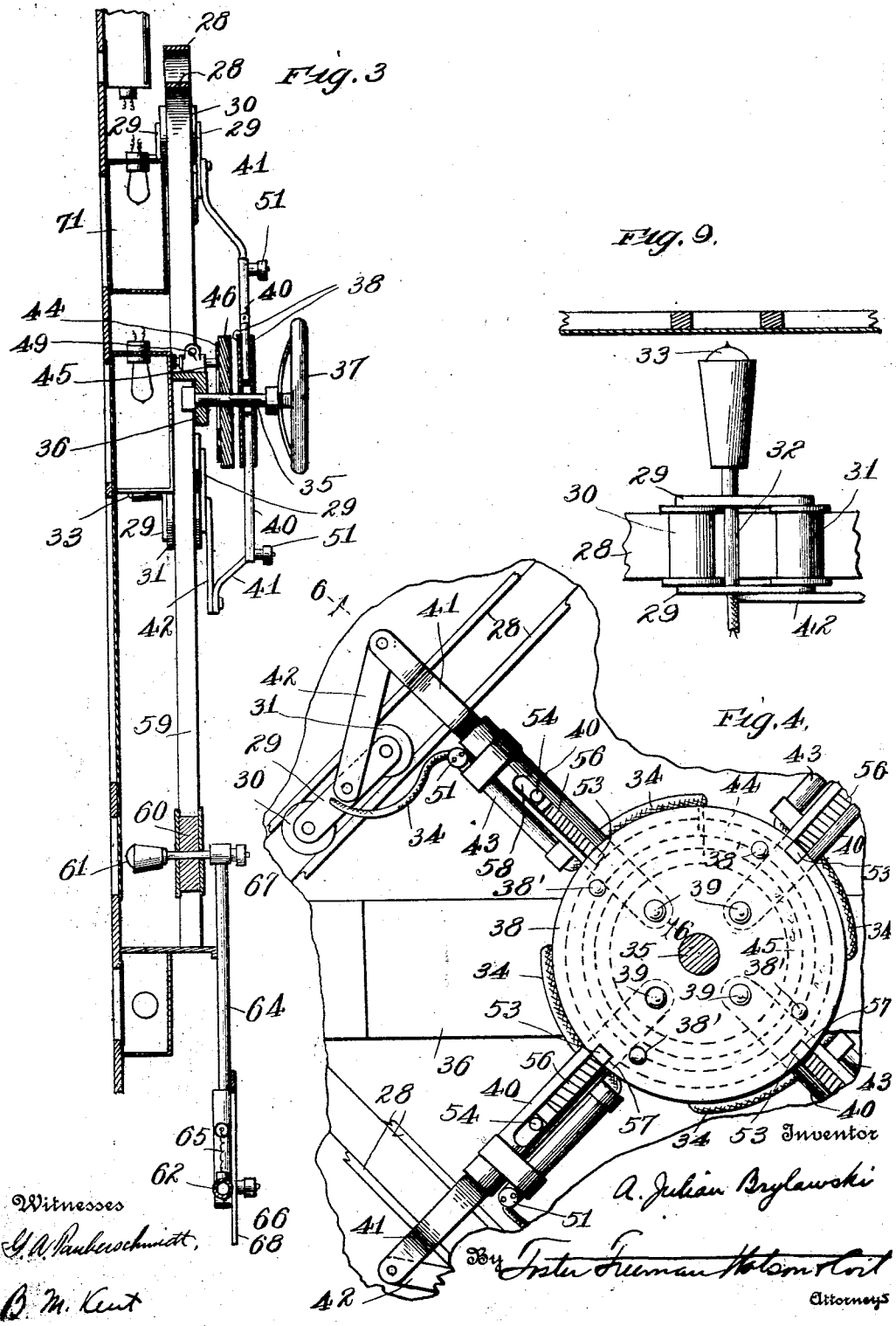

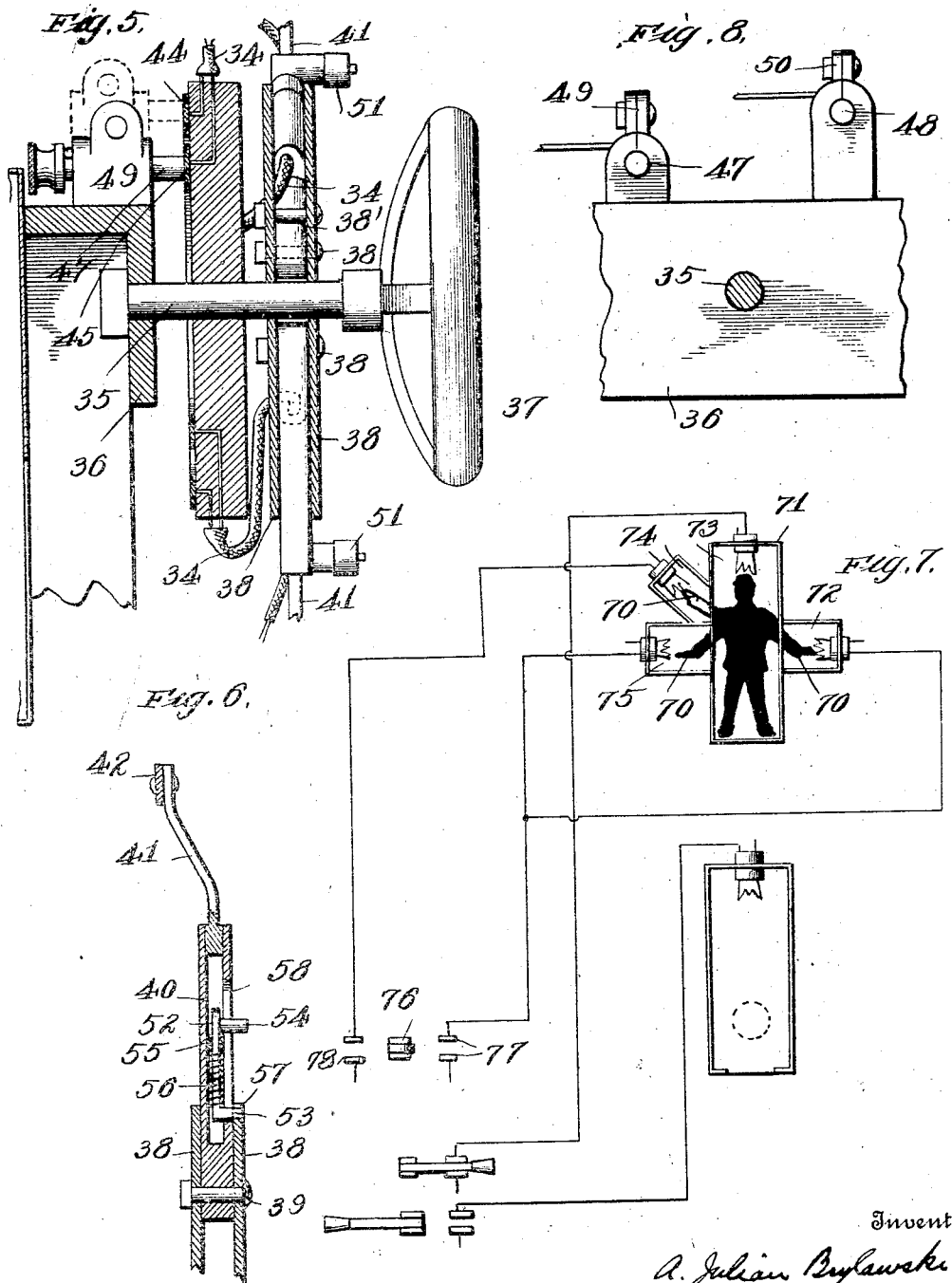

UNITED STATES PATENT OFFICE.

ABRAM JULIAN BRYLAWSKI, OF WASHINGTON, DISTRICT OF COLUMBIA.

SCORE-BOARD.

1,149,021.  Specification of Letters Patent.  Patented Aug. 3, 1915.

Application filed August 22, 1913. Serial No. 786,149.

*To all whom it may concern:*

Be it known that I, ABRAM JULIAN BRYLAWSKI, a citizen of the United States, and resident of Washington, District of Columbia, have invented certain new and useful Improvements in Score-Boards, of which the following is a specification.

This invention relates to improvements in score boards, or apparatus for reproducing a ball game, and has for its objects the provision of means whereby the plays may be exhibited with practically as much detail as they are given by the news service which reports the games.

It has been one of my objects to provide a board in which the base runners are indicated by lights moving along the base lines and the course of the ball between the pitcher and catcher is similarly indicated by a moving light.

In addition to these objects it has been my further object to provide an apparatus of this character in which several base runners may be indicated and moved simultaneously along the base lines and in which each base runner may be indicated as moving back and forth along a base line independently of the other base runners.

A further object of the invention is to exhibit a representation of an umpire and to provide means whereby this representation is shown with the arms in different positions to indicate the different decisions, in the manner now customary among base ball umpires.

Associated with the apparatus for illustrating the plays are the usual scoring devices by means of which the score is kept as the game progresses.

I have illustrated in the accompanying drawings what I now consider to be the preferred form of my invention, it being understood that various details of the apparatus illustrated may be changed without departing from the spirit of the invention as defined in the claims, and therefore I do not wish to be limited to the exact details shown and described.

In the drawings, Figure 1 is a front elevation of that portion of the apparatus which represents the ball field; Fig. 2 is a rear elevation of the apparatus shown in Fig. 1; Fig. 3 is an enlarged vertical section on the line 3—3 of Fig. 2; Fig. 4 is an enlarged detail elevation of the central part of Fig. 2; Fig. 5 is an enlarged portion of Fig. 3; Fig. 6 is a detail section on the line 6—6 of Fig. 4; Fig. 7 is a diagram of the circuits for controlling the lights which indicate the umpire; and Figs. 8 and 9 are details.

Referring to the drawings, 10 indicates the board, which may be made of any suitable material, and which, as shown in Fig. 1, has represented on the front thereof a base ball field with the different players in substantially the same relative positions which they usually occupy in an actual game. The base lines 11, 12, 13 and 14 are preferably translucent so that a light moving therealong at the rear of the board will be perceptible from the front of the board. The bases are indicated at 15, 16, 17 and 18 and are also of translucent material. The line 19 between the pitcher and catcher is also made translucent so as to show a light which is moved therealong at the rear of the board. Arranged in the outfield are a plurality of spots 20 of translucent material each of which is adapted to show a light arranged in the rear thereof.

At the top of the board is a bell 21 which is usually rung when a "hit" is made, and, on either side, near the top of the board are different words 22 which when lighted up from the rear indicate that a certain character of play has been made. Adjacent the bottom of the board and on either side of the catcher's position are places for indicating the score, for the inning, of the side batting. Below these are other words 23 for the same purpose as the words indicated at 22.

On either side of the representation of the field are the lists of players 24 and 25 and alongside of these lists are arranged the translucent spots 26 which are adapted to be lighted up for the purpose of indicating which player is batting.

Arranged on the back of the board are boxes 27 containing electric lamps, these lamps being adapted to light up the different positions of the players and the words appearing on the front of the board and being controlled by suitable switches which may be located at any convenient point.

For the purpose of representing the base runners I provide on the back of the board, immediately in the rear of the base lines, a pair of tracks 28 on which run the travelers 29, each traveler consisting preferably of a pair of rollers 30 and 31 carried by a suitable frame which also carries a post 32 on which is an electric lamp 33, this lamp being supplied by means of a flexible cable 34. At the central point in the diamond formed by the base lines I mount a shaft 35, this shaft being carried by a suitable support 36 and having arranged thereon a hand wheel 37, by means of which the shaft is rotated, and a pair of disks 38. The disks 38 have pivoted thereto, by means of the pins 39, four arms 40. Each of the arms consists of a tubular member to the outer end of which is secured an extension 41, this extension being connected with one of the travelers 29 by means of a link 42. From Figs. 2 and 4 it will be obvious that the travelers will be moved along the tracks 28 when the hand wheel 37 is rotated. Therefore, if the lamps carried by the travelers are lighted, it will appear from the front of the board that the four lights, or runners, are moving simultaneously along the base lines.

In order to supply electricity to the lamps which are carried by the travelers 29, the cables 34 extend along the arms 40, being carried in tubes 43 and have their inner ends connected with a pair of collector rings 44 and 45 which are carried by a disk 46 of insulating material (see Figs. 3, 4 and 5). Coöperating with the collector rings 44 and 45 are the brushes 47 and 48 which are carried in suitable brackets 49 and 50, respectively, these brackets being supported on the member 36, as shown in Figs. 5 and 8. The brushes 47 and 48 are fixed and connected with a source of electricity in the usual manner so that the current will flow through the brushes and collector rings and the different circuits 34 to the lamps carried by the travelers. In each of these circuits there is arranged a switch indicated at 51, this switch being preferably of the push-button type and in a position where it may be conveniently operated to throw on and off the light controlled thereby.

In order to represent plays in which one of the base runners returns to a base from which he has run, or runs back and forth between two bases, I have pivoted the arms 40 to the plates 38 and provided latches for normally holding the arms in their usual position. One of these latches is clearly illustrated in Fig. 6 and comprises a member 52 arranged in the tubular arm 40 and provided with two lateral projections or lugs 53 and 54. The member 52 slides through a fixed abutment 55 in the tubular arm 40 and a spring 56 is arranged between this abutment and the projection 53 and tends to move the member 52 inwardly toward the shaft 35. One of the plates 38 is provided with a notch 57 which is adapted to receive the projection 53 and thus lock the arm 40 against a pin 38' and prevent its swinging on the pivot 39. The pin 38' serves as a stop to limit the swinging of the arm 40 in one direction and when the arm is against the pin the projection 53 will register with the slot 57. The tubular arm 40 is provided with a longitudinal slot 58 through which the projections 53 and 54 extend, and the projection 54 is adapted to be engaged by a finger of the operator for the purpose of withdrawing the projection 53 from the notch 57 to unlatch the arm 40 and permit its being swung on the pivot 39. When the arm 40 is thus swung on its pivot the traveler 29, which is moved thereby, will be moved along the tracks 28 independently of the hand wheel 37.

For the purpose of representing the movement of the ball between the pitcher and catcher I provide in the rear of the line 19 a pair of tracks 59 on which a traveler 60 is adapted to run. The traveler 60 carries a lamp 61 and is moved by means of an arm 62 which is pivoted at 63 and connected with the traveler by means of a link 64 (see Fig. 2). The lamp 61 is supplied by means of a circuit 65 which is carried by the arm 62 and the link 64 and controlled by switches 66 and 67.

In the usual operation of the apparatus two operators are employed, one to control the switches which throw on and off the fixed lights, and the other to operate the hand wheel 37 and the traveler 60 and control the movable lights. It is sometimes desirable to have the traveler 60 operated by the person having control of the switches, and therefore I provide the switch 66 for throwing on and off the light 61, the switch 67 being provided for the person who operates the hand wheel 37 so that he can conveniently throw on and off the light 61. A guide 68 for the arm 62 is provided for the purpose of giving the arm lateral support.

Referring to Fig. 1, it will be seen that I have indicated an umpire at 69 and in order to represent the different decisions I have shown the three arms 70, one of which is raised and the other two of which are in a lowered position, these arms being normally invisible from the front of the board. In order to show these arms I provide on the back of the board (see Fig. 7) a box 71 having four compartments 72, 73, 74 and 75, these compartments being separated by opaque partitions and each having therein an electric lamp supplied by suitably arranged circuits and controlled by the necessary switches to throw these lamps on and off. From Fig. 7 it will be seen that when the switch 76 bridges the terminals 77 the compartments 72 and 75 will be lighted and the umpire will appear with his arms in the downwardly spread position to indicate that the runner is "safe". When the switch 76 is thrown into position to bridge the terminals 76 the compartment 74 will be lighted and the umpire will appear with one of his arms in the raised position to indicate that the runner is "out". The compartment 73 is usually illuminated but the other compartments are normally dark so that the representation of the umpire will be very realistic.

It is believed that the operation of the apparatus will be readily understood from the foregoing description, but a brief outline of the main features will be given in order to show how the apparatus is manipulated to illustrate a game. The travelers 29 are normally located adjacent the bases and, assuming that there are no runners on the bases when the batter runs to first base, the light 33 which is over the home plate is thrown on and the hand wheel 37 rotated to move this light to first base, the lights carried by the other travelers being out. When a new batter takes his position, the light indicating the runner at first base is moved a slight distance toward second base to indicate the "lead" of the runner. The batter is indicated by the lighted figure x beside the home plate and when the batter runs to first base the light behind the figure is thrown off and the light on the traveler 29 which is at the home plate is thrown on and the travelers then moved along the tracks 28 to carry one light from first base to second base and the other light to first base. This operation brings another traveler 29 to the home plate and when another batter makes a "hit" or runs to first base the operation is repeated and there will be lights at first, second and third bases to indicate the runners. If any runner is declared "out" this is indicated by switching out the light which indicates this runner. If a runner returns to a base from which he tried to advance, in a play in which the other runners advanced one base, this is represented by swinging the arm 40, which moves the light representing this runner, to carry the light back to the base which he left. The light is then thrown off and the light on the traveler which was at the base is thrown on and the arm is then returned to its former position with the light, moved thereby, out.

It will thus be seen that with my improved apparatus I am able to show practically every play which the base runners make and that; viewed from the front of the board, the movements of the different lights will produce a remarkably realistic effect which will be readily understood by the observers.

The movements of the ball being thrown back and forth by the pitcher and catcher are clearly represented by means of the light carried by the traveler 60 and it is possible, by varying the rapidity with which the light moves from the pitcher to the catcher, to introduce amusing representations of "fast" and "slow" balls.

Having thus described my invention what I claim is:

1. In apparatus of the class described, the combination of a board having the representation of a ball field on the front thereof, ways at the rear of the board corresponding to the base lines, a revoluble member at the back of the board, travelers on said ways, and means whereby said travelers may be moved simultaneously by said member.

2. In apparatus of the class described, the combination of a board having the representation of a ball field on the front thereof, connected ways at the rear of the board corresponding to the base lines, a revoluble member at the rear of the board, independently movable travelers on said ways, and means whereby said travelers may be connected to said member so as to be moved simultaneously thereby.

3. In apparatus of the class described, the combination of a board having the representation of a ball field on the front thereof, connected ways at the rear of the board corresponding to the base lines, a revoluble member at the rear of the board, independently movable travelers on said ways, indicating devices carried by said travelers and normally imperceptible from the front of the board, means for independently rendering said devices perceptible from the front of the board, and means whereby said travelers may be connected to said member so as to be moved simultaneously thereby.

4. In apparatus of the class described, the combination of a board having the representation of a ball field on the front thereof, connected ways at the rear of the board corresponding to the base lines, a revoluble member at the rear of the board, arms pivotally connected to said member, travelers on said ways, means connecting each arm with a separate traveler to move the latter, and means for normally holding said arms so that they are prevented from swinging on their pivots.

5. In apparatus of the class described, the combination of a board having the representation of a ball field on the front thereof, connected ways at the rear of the board corresponding to the base lines, a revoluble member at the back of the board, arms pivotally connected to said member, travelers on said ways and each provided with an indicating device normally imperceptible from the front of the board, means for independently rendering said devices perceptible from the front of the board, means connecting each arm with a separate traveler to move the latter, and means for normally holding said arms so that they are prevented from swinging on their pivots.

In testimony whereof I affix my signature in presence of two witnesses.

ABRAM JULIAN BRYLAWSKI.

Witnesses:
A. BRYLAWSKI,
ALAN J. BACHRACH.